Patented Oct. 21, 1952

2,615,027

UNITED STATES PATENT OFFICE 2,615,027

PROCESS FOR PRODUCING NONCRYSTALLIZING COPPER PHTHALOCYANINE

Francis Philipp Bluemmel, Westfield, and Lawrence D. Lytle, Plainfield, N. J., assignors to General Aniline & Film Corporation, New York, N. Y., a corporation of Delaware No Drawing. Application September 14, 1950, Serial No. 184,912

3 Claims. (Cl. 260—314.5)

This invention relates to a process for improving the physical properties of copper phthalocyanine, particularly the tendency of copper phthalocyanine to crystallize.

Coloring matters of the phthalocyanine series, particularly the blue halogen-free copper phthalocyanine, have tinctorial properties and light fastness qualities which recommend them particularly for use as pigments for paints, lacquers, and printing compositions. However, they are subject to a tendency to flocculate and crystallize from the organic solvent employed as the vehicle. By flocculation is meant the tendency of the pigment to aggregate into clusters or groups of particles which have been wet by the vehicle as a unit causing them to settle out from the paint or lacquer. This is a disadvantage where white pigments such as zinc oxide or titanium dioxide are employed to dilute the copper phthalocyanine pigment since the weakening effect of flocculation on the tinctorial value of the latter is then particularly noticeable. In printing inks and lacquers, the weakening effect of flocculation is not as objectionable, since the copper phthalocyanine pigment as a rule is employed full strength in such mixtures. The added tendency of chlorine-free copper phthalocyanine to crystallize from the organic solvent or vehicle presents an additional problem, since an initial crystallization generally occurs rather soon after the copper phthalocyanine pigment has been mixed with the solvent and this is followed by a slower crystallization process upon further standing, resulting in a considerable degree of crystallization after one or two hours. This crystallization or crystal growth is practically irreversible. In view of the deleterious effects of crystallization, the use of such copper phthalocyanine pigments, which otherwise constitute valuable coloring matters, is somewhat limited. When employed in a lacquer, for instance, it is difficult for the user to obtain the full color value and the strength of the color may vary from day to day, resulting in shade and strength differences from the same supply of lacquer.

Numerous suggestions have been made to overcome this tendency of halogen-free copper phthalocyanine to crystallize and flocculate. One such method is based upon the addition of tin phthalocyanine to the copper phthalocyanine. In accordance with this method, the two phthalocyanine pigments may be pre-mixed or brought together by the paint mixer. Should it be necessary for the copper phthalocyanine to remain in the vehicle for any length of time prior to the addition of the tin phthalocyanine, the crystallization of the former would be initiated and the deterring effect of the added tin phthalocyanine would not be realized. Furthermore, tin phthalocyanine is somewhat unstable in sulfuric acid, with which copper phthalocyanine is generally treated in order to obtain a fine dispersion. Consequently, the mixing of the tin phthalocyanine with the copper phthalocyanine prior to dispersion of the latter presents difficulties. Also, it would appear that the addition of tin phthalocyanine has some modifying effect on the shade of the copper phthalocyanine.

Another method for controlling the crystal growth of copper phthalocyanine in the vehicle contemplates the formation of an aluminum benzoate lake or compound pigment with the copper phthalocyanine. In this method the mixing must take place in the liquid or paste form, since purely physical mixtures of dry aluminum benzoate and dry copper phthalocyanine do not produce the non-crystallizing effect. The aluminum benzoate of this process forms the sub-stratum of the lake or compound pigment and has no color value. It, therefore, acts to dilute or diminish the tinctorial strength of the copper phthalocyanine pigment. Accordingly, this process can only be employed where full color strength is not desired.

It is an object of the present invention to produce a non-crystallizing, non-flocculating, blue copper phthalocyanine pigment which may be employed in liquid pigmenting compositions free of the defect of crystallization and without the necessity of adding other pigments or materials to stabilize against crystallization and flocculation. For the purposes of definition a non-crystallizing copper phthalocyanine may be said to be one which will show very few or no crystals upon standing 72 hours in a toluene solution.

We have found that halogen-free copper phthalocyanine may be produced in a non-crystallizing, non-flocculating form by adding small amounts of anhydrous aluminum chloride during the synthesis of the copper phthalocyanine from phthalic anhydride, urea, and cuprous chloride. Cuprous chloride and aluminum chloride are metal donor compounds both of which provide metal which enters the phthalocyanine molecule in the synthesis involving reaction of phthalic anhydride and urea. We are aware that aluminum chloride has been reacted with phthalic anhydride and urea to produce aluminum phthalocyanine, and that aluminum chloride has been employed as a condensing agent in the reaction of dinitriles, such as phthalic acid dinitrile, and ketonic compounds, such as benzanthrone. In such processes, however, copper phthalocyanine is not produced and the proportion of aluminum chloride to phthalic anhydride or phthalic acid dinitrile is high. In the phthalic anhydride-aluminum chloride process from 20 to 25% of aluminum chloride, based on phthalic anhydride, is employed, and approximately two parts of aluminum chloride to one of phthalic acid dinitrile are employed in the dinitrile condensation process. These processes produce aluminum phthalocyanines which are crystalline.

In our process the amounts of aluminum chloride employed are in the range of from 5 to 7½% based on the amount of phthalic anhydride. When such percentages of aluminum chloride are employed in the synthesis of the copper phthalocyanine, it has been found that non-crystallizing, non-flocculating copper phthalocyanine is produced containing small amounts of aluminum phthalocyanine. If excessive amounts of cuprous chloride are used, then the effectiveness of the aluminum chloride in producing the non-crystallizing product is diminished. Consequently, it is important to maintain the amount of reacting cuprous chloride to approximately 20% of the amount of phthalic anhydride, or to adjust the ratio of cuprous chloride to aluminum chloride at not more than 4 to 1, and preferably approximately 3½ to 1. It has also been found that the addition of small amounts of chlorine in the range of approximately 1 to 2% of chlorine based on the amount of phthalic anhydride tends to improve the yield and further improve the non-crystallizing characteristic of the copper phthalocyanine. Increasing the amount of chlorine impairs the crystallization properties, and the omission of chlorine diminishes the yield and produces a product which will crystallize somewhat earlier than the products obtained when the small amounts of chlorine are employed.

According to this procedure for the production of copper phthalocyanine from phthalic anhydride, urea, and cuprous chloride, the phthalic anhydride and urea are heated in trichlorobenzene while distilling off some water and trichlorobenzene. There is then added to this mixture a mixture of additional urea, cuprous chloride, anhydrous aluminum chloride, and ammonium molybdate in trichlorobenzene. The combined mixtures are then heated, and, if desired, at this point chlorine gas may be bubbled through the reaction mixture at 180° C. Additional trichlorobenzene is then added, and the temperature adjusted to 100° C., at which temperature the reaction mixture is filtered and washed with trichlorobenzene. The reaction mixture is then sucked dry and the filter cake steam distilled to remove the solvent. It is then slurried with hydrochloric acid, boiled, filtered, and washed free of acid and aluminum salts with warm water, and dried.

The resulting product is non-crystallizing and non-flocculating. It may be subjected to the usual after-treatments generally applied to copper phthalocyanine pigments. Thus, the dried product may be dispersed in sulfuric acid and stirred until practically all is dissolved, and the acid solution drowned in water, stirred, filtered, washed neutral, and conditioned.

The following example will serve to more fully illustrate the invention, and it is understood that the specific conditions and proportions recited therein are not given as limitations but as illustrative of the best method of performing the process:

Example

Into a 5 liter, 3 neck flask there are charged 1,060 cc. trichlorobenzene, 500 g. phthalic anhydride, and 600 g. urea. This charge is heated to 170° C. and held there for two hours while distilling off some water and trichlorobenzene. A mixture is then added of 555 cc. trichlorobenzene, 200 g. urea, 93.5 g. cuprous chloride, 27.8 g. aluminum chloride anhydrous, and a slurry of 2.0 g. ammonium molybdate in 135 cc. trichlorobenzene. The composite mixture is heated back to 170–175° C. and held there for three hours. The temperature is then raised gradually to 205° C. and held there for six hours. The reaction mixture is then cooled to 180° C. and 5 g. of chlorine gas are bubbled into the mixture while holding the temperature at 180° C. for two hours. There are then added 935 cc. trichlorobenzene, and the temperature is adjusted to 100° C. and the reaction mixture filtered. The product is washed with 1,000 cc. trichlorobenzene at 100° C. and sucked dry as possible. The filter cake is then steam distilled to remove the solvent and 500 cc. of 30% hydrochloric acid added and the mixture boiled for ½ hour. It is then filtered and washed free of acid and aluminum salts with warm water, and dried. The yield is 457 g., equal to 91.4% efficiency.

Dispersion

Into a 1 liter, 3 neck flask there are charged 500 g. sulfuric acid 96%, to which is then added 50 g. of the copper phthalocyanine product of the above procedure. The mixture is then stirred until practically all of the product has dissolved. The resulting acid solution is then drowned in 3,100 cc. of water at 30° C., stirred for ½ hour, filtered, washed neutral with water, and prepared for conditioning or further after-treatments known to the art for improving the dispersibility or tinctorial properties of the copper phthalocyanines.

The product produced by this procedure has strong tinctorial properties and retains all of the best qualities of the copper phthalocyanine pigment. In addition, it does not exhibit the tendency to flocculate characteristic of most full strength phthalocyanine pigments, nor does it exhibit the tendency to crystallize out of coal tar solvents, such as benzene, toluene, and xylene. Accordingly, the copper phthalocyanine containing the small amounts of aluminum phthalocyanine obtained by this process may be employed as a pigment for enamels to be used either in dipping or spraying with equal color strength. Lacquers incorporating the pigment of this process will be characterized by a high container stability.

Having now fully described our invention and illustrated the best manner of performing it, what we claim as new is:

1. A process for the production of a non-crystallizing, non-flocculating copper phthalocyanine which comprises reacting phthalic anhydride, urea, and as sole metal donor compounds, cuprous chloride, and aluminum chloride, the cuprous chloride being present in an amount of approximately 20% and the aluminum chloride in an amount of from 5 to 7½% of the amount of phthalic anhydride, and recovering the resulting phthalocyanine pigment from the reaction mixture.

2. A process for the production of a non-crystallizing, non-flocculating copper phthalocyanine which comprises reacting phthalic anhydride, urea, and as sole metal donor compounds, cuprous chloride, aluminum chloride, and chlorine, the cuprous chloride being present in an amount of approximately 20%, the aluminum chloride in an amount of from 5 to 7½%, and the chlorine in an amount of from 1 to 2% of the amount of phthalic anhydride, and recovering the resulting phthalocyanine pigment from the reaction mixture.

3. A process for the production of a non-crystallizing, non-flocculating copper phthalocyanine which comprises heating phthalic anhydride and urea in trichlorobenzene, adding as sole metal donor compounds, cuprous chloride in an amount of approximately 20% of the amount of phthalic anhydride, and aluminum chloride in an amount of from 5 to 7½% of the amount of phthalic anhydride, continuing to heat in trichlorobenzene while introducing chlorine in an amount of from 1 to 2% of the amount of phthalic anhydride, and recovering the resulting phthalocyanine pigment from the reaction mixture.

FRANCIS PHILIPP BLUEMMEL.
LAWRENCE D. LYTLE.

REFERENCES CITED

The following references are of record in the file of this patent:

Fiat Final Report No. 1313, Feb. 1, 1948, pages 275–276.